United States Patent
Polti (10) Patent No.: US 9,462,911 B2
(45) Date of Patent: Oct. 11, 2016

(54) COFFEE MACHINE FOR PREPARATION OF COFFEE

(71) Applicant: Aroma Polti SA, Lugano (CH)

(72) Inventor: Stefano Polti, Gentilino (CH)

(73) Assignee: Aroma Polti SA, Lugano (CH)

( * ) Notice: Subject to any disclaimer, the term of this patent is extended or adjusted under 35 U.S.C. 154(b) by 8 days.

(21) Appl. No.: 14/171,487

(22) Filed: Feb. 3, 2014

(65) Prior Publication Data

US 2015/0216353 A1 Aug. 6, 2015

(51) Int. Cl.
*A47J 31/46* (2006.01)
*A47J 31/40* (2006.01)
*A47J 31/56* (2006.01)
*A47J 31/52* (2006.01)

(52) U.S. Cl.
CPC ............... *A47J 31/56* (2013.01); *A47J 31/407* (2013.01); *A47J 31/46* (2013.01); *A47J 31/52* (2013.01)

(58) Field of Classification Search
CPC ........ A47J 31/46; A47J 31/407; A47J 31/52; A47J 31/56; A23F 5/262
See application file for complete search history.

(56) References Cited

U.S. PATENT DOCUMENTS

| | | | | |
|---|---|---|---|---|
| 3,975,996 A | * | 8/1976 | Vitous | A47J 31/0642 99/295 |
| 4,137,833 A | * | 2/1979 | Yelloz | A47J 31/54 99/293 |
| 4,205,598 A | * | 6/1980 | Leuschner | A47J 31/0573 99/307 |
| 4,262,585 A | * | 4/1981 | Leuschner | A47J 31/545 392/471 |
| 4,638,928 A | * | 1/1987 | Webster | A47J 31/50 126/384.1 |
| 4,975,559 A | * | 12/1990 | Frisch | A47J 31/0573 392/449 |
| 4,994,392 A | * | 2/1991 | Welledits | C12C 7/06 126/351.1 |
| 2005/0247205 A1 | * | 11/2005 | Chen | A47J 31/057 99/279 |
| 2012/0231134 A1 | * | 9/2012 | Gonen | A47J 31/36 426/433 |
| 2012/0240779 A1 | * | 9/2012 | Perentes | B65D 84/8043 99/283 |
| 2013/0129885 A1 | * | 5/2013 | Doglioni Majer | A47J 31/002 426/431 |

FOREIGN PATENT DOCUMENTS

| | | | |
|---|---|---|---|
| CN | 201958623 | * | 9/2011 |
| DE | 2806205 | * | 8/1979 |
| GB | 1261367 | * | 1/1972 |

OTHER PUBLICATIONS

English Translation of CN201958623 published Sep. 2011.*
English Translation of DE2806205 published Aug. 1979.*

* cited by examiner

*Primary Examiner* — Anthony Weier
(74) *Attorney, Agent, or Firm* — Dorsey & Whitney LLP (57) ABSTRACT

A coffee machine having water heating means, a pump for supplying water into the heating means and a dispensing unit for extracting the coffee with the heated water is described. The heating means include a tubular element inside which the water supplied by the pump flows, and a heating element, separated from the tubular element by an air cavity; the pump and the heating element are connected and regulated by an electronic board, so as to supply into the dispensing unit the heated water in at least two different modes and at a same preset temperature, the different modes corresponding to different types of coffee to be dispensed.

22 Claims, 6 Drawing Sheets

COFFEE MACHINE FOR PREPARATION OF COFFEE

TECHNICAL FIELD

Embodiments of the present invention relates to a coffee machine and to a method of preparation of coffee.

BACKGROUND

Machines for extracting coffee from a capsule or from a pod containing compressed coffee powder are known. Also known are machines for extracting coffee from a filter containing ground coffee and able to be filled manually.

These machines comprise a water tank, a pump and a heating means, for example a boiler, for heating the water to a temperature of about 90° C., suitable for extraction of the coffee.

When the water reaches the required temperature, the heating means are automatically switched off and the user may activate dispensing of the coffee, by means of a pushbutton which discharges a measured amount of water into the capsule (pod) or into the filter containing the ground coffee. The hot water penetrates into the capsule through a capsule holder or a filter holder for the ground coffee and extracts the liquid coffee.

Machines which use capsules (pods) are popular because the coffee is already prepared in a measured amount and compressed, thus avoiding the need for the user to fill the coffee manually and greatly speeding up preparation thereof. Also the machine emptying operation is simplified, since the user merely has to remove the capsule and does not have to clean or wash the machine once the coffee has been dispensed.

However, machines which use capsules (pods) are not very versatile because they do not allow the preparation of coffee in different concentrations, for example the preparation of both espresso coffee and Americano coffee.

Moreover, both machines which use capsules (pods) and manual filter machines have major drawbacks associated with the method of heating the water.

A first drawback consists in the long machine heating time and the consequent long wait before dispensing occurs, this being necessary in order to heat all the water inside the boiler to the correct temperature for extraction of the coffee (about 90° C.).

A second drawback relates to the impossibility of precisely regulating the temperature of the water.

In fact, the heating means are switched off when the water reaches the required temperature. However, after switching off, it may happen that the user does not perform immediately dispensing of the coffee and that the water inside the boiler cools down again.

In order to prevent the coffee from being prepared with water which is too cold, it is known to sense constantly the temperature of the water inside the boiler and to activate again the heating means in order to heat up the water again. However, between switching off and subsequent switching on again of the heating means, the temperature of the water is subject to fluctuations which affect the quality of the coffee dispensed.

Moreover, frequent switching on and off of the heating means results in wasted energy. The amount of wasted energy is considerable because all the water inside the boiler must be heated again.

On the other hand, in order to avoid the temperature fluctuations, it is not sufficient to keep the heating means always switched on or to set a long standby time, for example of 10 minutes, before they switch off; these solutions in fact further increase the amount of wasted energy.

Finally, even performing dispensing of the water as soon as the machine has reached the required temperature—namely, assuming use of the machine in the most efficient manner possible—does not guarantee that the temperature of the water is correct. In fact it happens that dispersion of heat along the fluid path which conveys the water from the boiler to the capsule (pod) or the filter influences the temperature.

In an attempt to overcome this further drawback, in the known machines it is envisaged raising the temperature of the water inside the boiler to a value T2 higher than the temperature T1 required during dispensing, for example to T2=98° C. instead of T1=90° C., thus compensating for the losses of heat along the fluid path.

However, it is not possible to predict exactly the loss of heat along the path, for example as a result of the ambient temperature, which influences dispersion. Also the water present in the boiler, which may consist of one or more liters, may cause sudden heat dispersion or sudden changes in temperature, which furthermore may be differently sensed in different portions of the boiler.

It thus happens that the water reaches the capsule (pod) or the manual filter too hot or too cold, preventing correct extraction of the coffee.

In other words, even if the known coffee machines are programmed to prevent the dispensing of water before a preset temperature is reached, and avoid the incorrect extraction of the coffee with water which is too cold, they are unable to avoid long waiting times for the user, prevent temperature fluctuations and achieve savings in electric power.

The technical problem forming the basis of embodiments of the present invention is that of devising a coffee machine using pods, capsules or a manual filter able to: heat rapidly the temperature of the water, thus reducing the waiting times for the coffee; raise the temperature of the water to a preset optimum value for extraction of the coffee from the pod, capsule or manual filter, and maintain this temperature for a long time, in order to obtain a short coffee, espresso, Americano coffee or a coffee of a different type of quality and superior taste, but also reduce substantially the energy consumption, thus overcoming all the drawbacks which hitherto are associated with the known machines.

SUMMARY

The idea forming the basis embodiments of the present invention is to use a heat exchanger, essentially formed by placing an air chamber between a tubular element of small diameter, inside which the water is made to flow, and an outer tube associated with heating means, and regulating the water flow inside the tubular element and the heating means so that the temperature of the water downstream of the tube is ideal (optimum) for extraction of the coffee, and in particular between 92° C. and 94° C., independently of the quantity of water to be dispensed or the type of coffee which is to be prepared, and so that the temperature is maintained for as long as possible at the ideal value, even when the heating means are switched off.

In particular, the idea forming the basis of embodiments of the present invention is to use water heater (e.g., heating means), for example a spiral, around the outer tube suitable for heating by means of electromagnetic induction the inner tubular element, which heats immediately the water inside it and the air chamber on the outside thereof. The air chamber thus heated keeps the tubular element at the ideal temperature and avoids fluctuations in the temperature, even when the heating means are switched off.

According to the proposed solution described above, the water is heated in a practically instantaneous manner since the heating means, as a result of electromagnetic induction, rapidly heat the inner tubular element and the latter transfers instantaneously the heat to the water situated inside it, especially when the tubular element has a small cross-section compared to its length, and instantaneously also transfers the heat to the air chamber situated on the outside, in particular if the diameter of the air chamber has a small cross-section compared to its length.

The temperature of the air inside the air jacket remains constant also for several seconds after switching-off of the heating means, therefore also keeping the water inside the inner tubular element at a temperature which is substantially already correct for dispensing of the coffee, even when the heating means are switched off, should the user not immediately perform dispensing of the coffee, thus speeding up preparation thereof and reducing considerably the energy consumption or the number of times the heating means are subsequently switched on again.

The heating means are regulated electrically to raise the temperature of the water inside the inner tubular element to the preset value, i.e. 92° C. and 94° C., independently of the amount (or flowrate) of the water which flows through the tubular element for dispensing of a coffee, thus ensuring that the water used to make the coffee is always at the ideal temperature, for any type (concentration) of coffee which is dispensed and for any flowrate and pressure value.

On the basis of the proposed solution described above, the technical problem is solved by a coffee machine comprising water heating means, a pump for supplying water into the heating means, and a dispensing unit for extracting the coffee with the heated water, characterized in that the heating means comprise a tubular element, inside which the water supplied by the pump flows, and a heating element, separated from the tubular element by an air cavity, the pump and the heating element being connected and regulated by an electronic board, so as to supply into the dispensing unit the water heated in at least two different modes m1, m2 and at a same preset temperature T, said different modes corresponding to different types of coffee to be dispensed, for example coffee in different concentrations.

In particular, the electronic board regulates a flowrate P1, P2 of water from the pump so that the flowrate is higher for dispensing coffee in a first mode, for example Americano coffee, and lower for dispensing coffee in a second mode, for example espresso coffee. Advantageously, if the water flows rapidly (higher flowrate) or slowly (lower flowrate) inside the tubular element, the temperature downstream of the heating means is always the preset optimum temperature for extraction of the coffee, because the electronic board varies the electromagnetic field generated by the spiral, increasing the temperature of the inner tubular element if it is required to transfer more heat (higher flowrate) or reducing the temperature of the inner tubular element, if it is required to transfer a smaller amount of heat (lower flowrate).

The electronic board is programmed to supply into the dispensing unit at least two different measured amounts d1, d2 of heated water, for example a maximum amount d1 of 450 ml and a minimum amount d2 of 30 ml. The larger amount corresponds to a first dispensing mode, for example for Americano coffee, and the smaller amount corresponds to a second dispensing mode, for example for espresso coffee. Advantageously, according to this aspect, the electronic board not only regulates the pump and the heating means in order to obtain the preferred temperature T of the water downstream of the tubular element, but also meters a predefined quantity at said preferred temperature.

In a first embodiment, the dispensing unit comprises at least two outlets for heated water. The first outlet is associated with a higher flowrate and greater amount of water, for the preparation of Americano coffee, and the second outlet is associated with a lower flowrate and smaller amount of water, for the preparation of espresso coffee. In a different embodiment, the outlets are configured so as to be able to perform dispensing in both modes, and the dispensing mode of each outlet can be selected by the user.

The dispensing unit comprises a coffee container and a coffee container holder. The container holder is, for example, a filter holder incorporated in a handle which can be applied to the machine at one of the outlets.

The coffee container is a powder coffee container, for example a filter suitable for being filled manually. The container may also be a pod or a capsule for espresso coffee or a capsule for filter coffee (e.g. a K-cup) which is ready prepared for use.

According to a particularly advantageous aspect of an embodiment of the present invention, it is envisaged using only one container holder (handle or filter holder) suitable for receiving a filter which can be manually filled, or an adaptor, for adapting a pod or a capsule or a prepackaged cup, made by various manufacturers present on the market, to the container holder.

According to another particularly advantageous aspect of an embodiment of the present invention, it is envisaged that the dispensing pressure of the different coffee modes is mechanically regulated inside the dispensing unit. In particular, the dispensing unit comprises a valve designed to increase a pressure of the heated water inside the container, for example for dispensing a short coffee. The valve allows the coffee dispensing time to be prolonged and increases the pressure inside the container, i.e. inside the filter, the capsule or the pod.

In an embodiment, the valve is inside the adaptor. Advantageously, the same handle may be used to apply the manual filter or the capsules of various manufacturers, by means of the respective adaptors, to the machine and obtain different types of coffee, i.e. espresso, Americano, etc.

In an embodiment, it is envisaged that the adaptor with the valve is applied together with the container (capsule, pod, K-cup) to one of the outlets by means of the container holder and that the ground coffee container is instead applied by means of the container holder to the other outlet. In another embodiment, it is envisaged that it is possible to apply to both outlets the container holder with the coffee container (containing ground coffee, pod, capsule, K-cup, etc.), with or without the adaptor and the valve.

An electrovalve connected to the electronic board is designed to intercept the fluid flowing towards one of the outlets. If the user selects a first dispensing mode m1, the electrovalve intercepts the fluid path towards the second outlet and vice versa.

Advantageously, according to at least one embodiment of the present invention, a single pump and a single heating means are used in a single machine to prepare different types of coffee, while ensuring the characteristics for optimum dispensing, i.e. the water temperature, pressure, flowrate and dispensing time, are maintained, and reducing the energy consumption.

The aforementioned problem is also solved by a method of preparation of coffee, comprising the steps of pumping water towards the heating means, heating the water and supplying the heated water into a dispensing unit, for extraction of the coffee, and characterized in that the water is pumped inside a tubular element and is heated by means of electromagnetic induction by a heating element separated from the tubular element by means of an air cavity, this pumping and heating step being regulated electrically so as to supply the water into the dispensing unit at a predefined temperature and therefore allow the preparation of the coffee in different modes, under optimum conditions.

The regulating step comprises a variation of the flowrate of the water towards the heating means so that different quantities of water are supplied into the dispensing unit at the same predefined temperature, these different quantities of water corresponding to different types of coffee to be dispensed, including espresso coffee or Americano coffee or filter coffee.

The coffee is extracted from coffee in powder form or inside pods or capsules. The pressure of the water is increased mechanically inside the dispensing unit, in order to dispense espresso coffee. The pump and the heating means do not alter the pressure of the water. In particular, the increase in the pressure of the water inside the dispensing unit is performed by means of partial closure of a mechanical valve situated downstream of the tubular element, inside the dispensing unit.

According to alternative embodiment of the present invention, which is used more widely in the professional sector, for example in bars and restaurants, the water heating means comprise two or more tubular elements inside which the water supplied by the pump flows, and two or more respective heating elements, which are separated from the tubular elements by a corresponding air cavity.

The dispensing unit comprises two or more outlets, each associated with a tubular element, through which the water heated to a same preset temperature T may be simultaneously or selectively dispensed, in different modes, corresponding to different types of coffee to be dispensed, or in a same mode, corresponding to the same type of coffee to be dispensed.

In other words, according to this alternative embodiment of the coffee machine, it is possible to dispense simultaneously more than one coffee, for example three espresso coffees or an espresso coffee and an Americano coffee, at the same temperature T.

In this variant also, the water is pumped towards each heating element. Preferably, each heating element (and tubular element) is associated with a respective pump, and each heating element and the respective pump are connected and regulated by the electronic board.

Further characteristic features and advantages of the coffee machine according to embodiments of the present invention are provided in the following description, with reference to the accompanying drawings provided purely by way of a non-limiting example.

DETAILED DESCRIPTION

With reference to the accompanying drawings a coffee machine according to one or more embodiments of the present invention is schematically shown and indicated by 1, said coffee machine comprising a pump 2, heating means 3 which are connected to the pump in order to receive at their inlet water to be heated and connected at their outlet to a coffee dispensing unit 8 inside which the liquid coffee is extracted from the coffee powder by means of the heated water.

Figure 6:
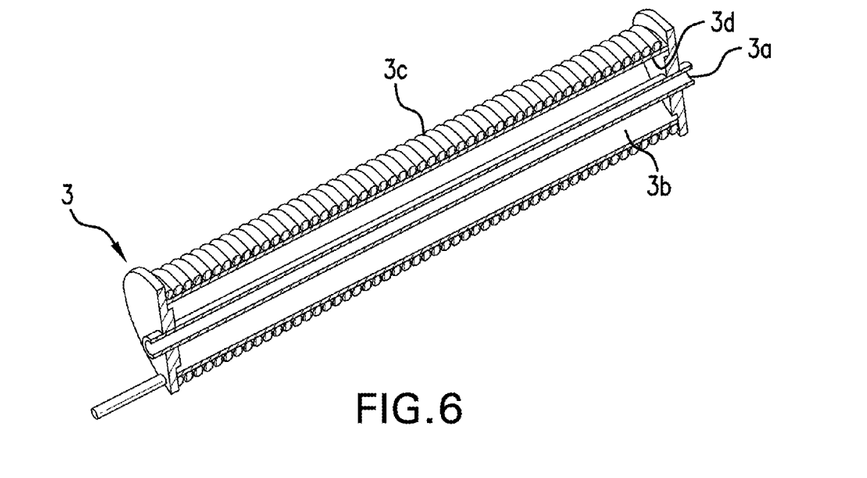
FIG. 6 shows a detail of the machine according to FIG. 1.

According to an embodiment of the present invention, the heating means 3 comprise a tube heat exchanger with an inner tubular element 3a of small cross-section, visible in FIG. 6, inside which the water supplied by the pump flows, and an outer tubular element 3d around which a heating element 3c is applied.

The heating element is a spiral 3c to which an electric voltage is applied in order to generate an electromagnetic field which heats by means of electromagnetic induction the inner tubular element 3a. The electromagnetic field is controlled by the electronic board. In particular, the board varies the magnetic field, increasing or decreasing the temperature of the inner tube which heats the water.

An air cavity is formed between the inner tubular element 3a and the outer tube 3d. When the electric voltage is applied to the heating element 3c and the inner tubular element 3a is heated, the water situated inside the tubular element 3d is heated very rapidly.

The tubular element 3a is made of steel, preferably AISI 430F ferromagnetic steel, and has a length of between 15 cm and 25 cm and a diameter of between 0.5 cm and 2 cm. The outer tubular element 3d is made of diamagnetic insulating material, with a diameter of between 3 cm and 5 cm.

It is envisaged that the heating element 3c is connected and controlled by an electronic board, not shown in the figure, designed to interrupt the electric power supply of the heating element 3c when the water temperature reaches a predefined value or to apply the electric power to the heating element 3c, when the water temperature falls below a predefined value.

It is also envisaged that the electronic board regulates the voltage applied to the heating element, increasing or decreasing it, in order to regulate consequently the water temperature.

In one embodiment, the water temperature is measured by a sensor situated downstream of the tube and directly inside the water.

The voltage of the heating element 3c is controlled and varied by the electronic board depending on the different conditions of use or dispensing mode of the coffee machine, associated with a different flowrate of the water inside the inner tubular element 3a, a different temperature of the water already present inside the tubular element or present inside the tank, or different water heating speeds.

In particular, the electronic board controls the pump and the heating element, so that the temperature of the water output from the heating means 3 is preset, preferably between 92° C. and 94° C., independently of the dispensing mode. A temperature in the aforementioned range is ideal for extraction of coffee of superior quality from a pod, a capsule, powder coffee or any other preparation.

In this connection, the board increases an electric voltage of the heating element 3c, when a greater amount of water is pumped, per unit of time, inside the inner tubular element 3a by the pump. The greater the speed with which the water flows through the heating means 3, the greater is the voltage applied to the heating element 3c, in order to transfer, per unit of time, a greater quantity of heat to the water.

The advantage of using the heat exchanger described above consists essentially in the fact that the water may be brought to an ideal temperature of 92-94° C. instantaneously, and for any type of coffee which is to be prepared and in that the heat dispersion is minimal. Consequently the efficiency of the machine from an energy point of view is increased, with considerable savings in energy. In this connection, when the heating element 3c is switched off, for example because the temperature has already reached the desired value, or because the machine is on standby and waiting for dispensing to be performed, the temperature of the air inside the cavity decreases very slowly, thus allowing, when the heating element 3c is switched on again, a reduction in the time needed to heat up the water again to the ideal temperature and the corresponding energy consumption.

According to an embodiment of the present invention, the heating element 3a and the pump are connected and regulated by the electronic board, so as to supply into the dispensing unit 8 the heated water in at least two different modes m1, m2, at a same preset temperature T of between 92° C. and 94° C., these different modes corresponding to different types of coffee to be dispensed, i.e. coffee in different concentrations.

For example, solely by way of example, the first mode m1 corresponds to the preparation of Americano coffee and the second mode corresponds to the preparation of espresso coffee. Several preparation modes may be obviously envisaged.

The electronic board regulates a flowrate P1, P2 of water from the pump 2 and the heating means so that the flowrate and the temperature downstream of the tubular element are the same, independently of the water flowrate or the amount of coffee which is dispensed. In fact the quantity of water necessary for preparation of Americano coffee is greater and must flow more rapidly through the dispensing unit compared to the quantity of water necessary for preparing espresso coffee which not only must flow more slowly, but must also be at a greater pressure inside the dispensing unit.

In this connection, the electronic board is programmed so as to ensure supplying, into the dispensing unit, of at least two different measured amounts d1, d2 of heated water, corresponding, respectively, to the two different dispensing modes m1, m2. In the case of Americano coffee, the electronic board ensures the supplying of an amount d1 greater than the amount d2 supplied for espresso coffee.

Essentially, the machine according to one or more embodiments of the present invention makes use of a single tank 7, single heating means 3 and a single pump 2 for preparing at least two different coffee dispensing modes.

In a preferred embodiment, it is envisaged that the two different modes are dispensed via two different outlets suitable for application of the coffee container from which the liquid coffee is extracted, in said at least two dispensing modes m1, m2.

Figure 1:
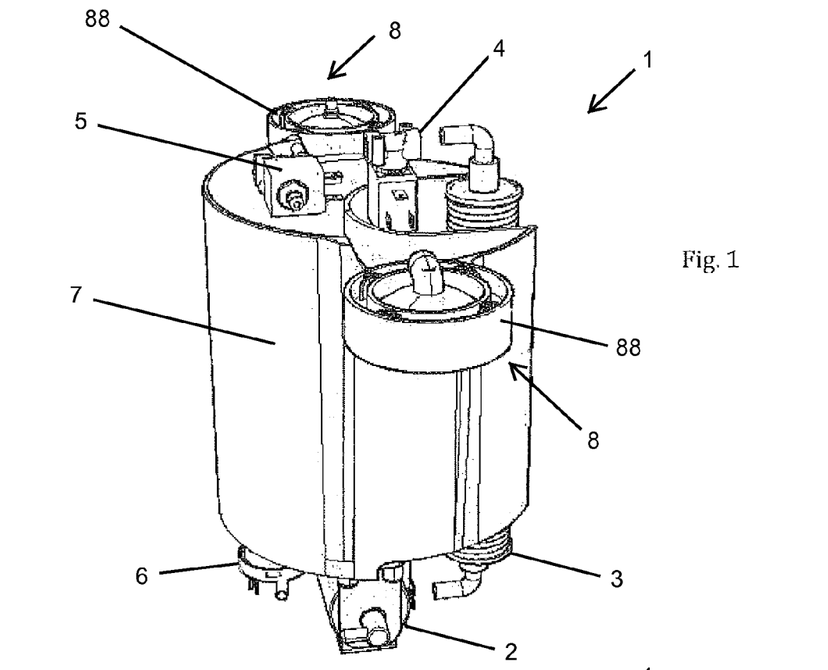
FIGS. 1,2,3,4, and 5 are different perspective views of the machine according to FIG. 10.
Figure 2:
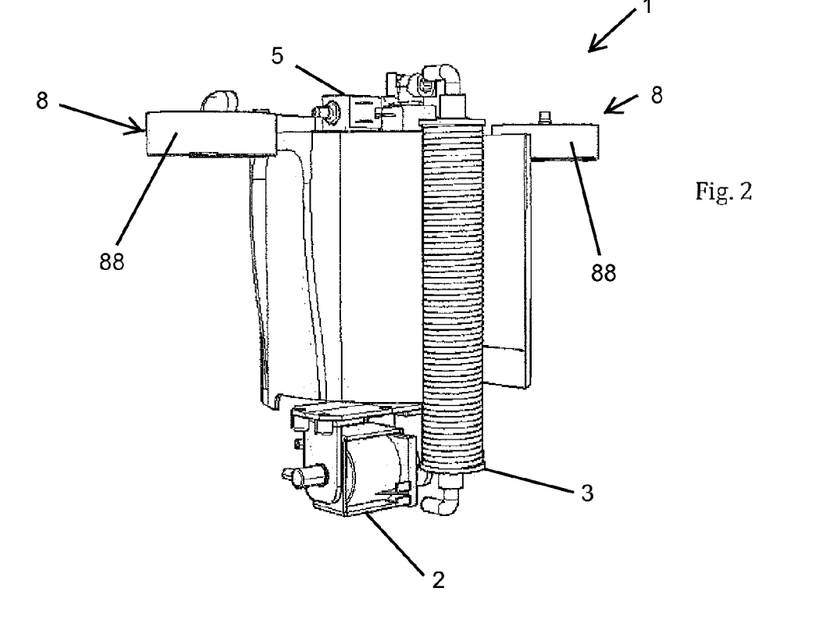
Figures 3, 4:
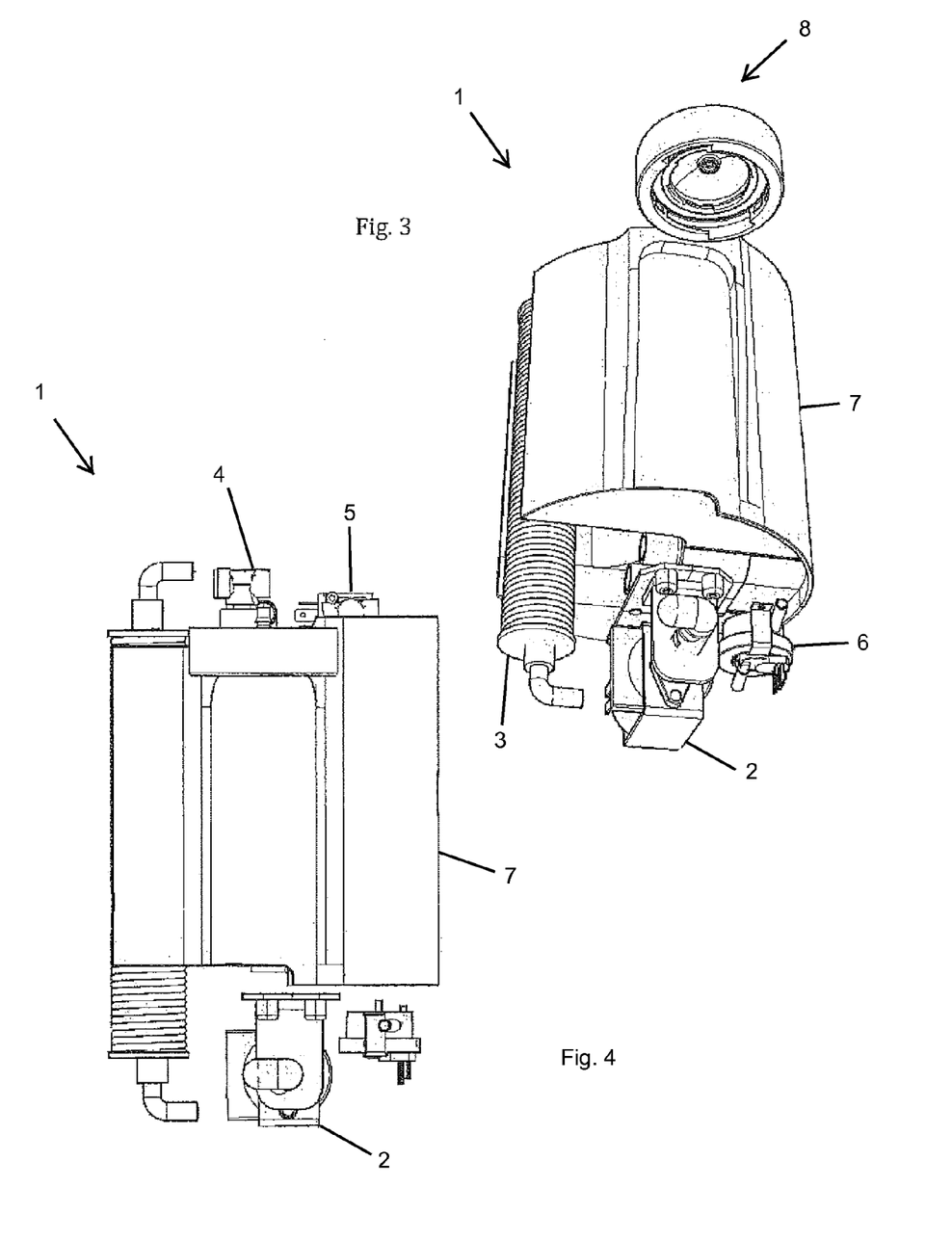
Figure 5:
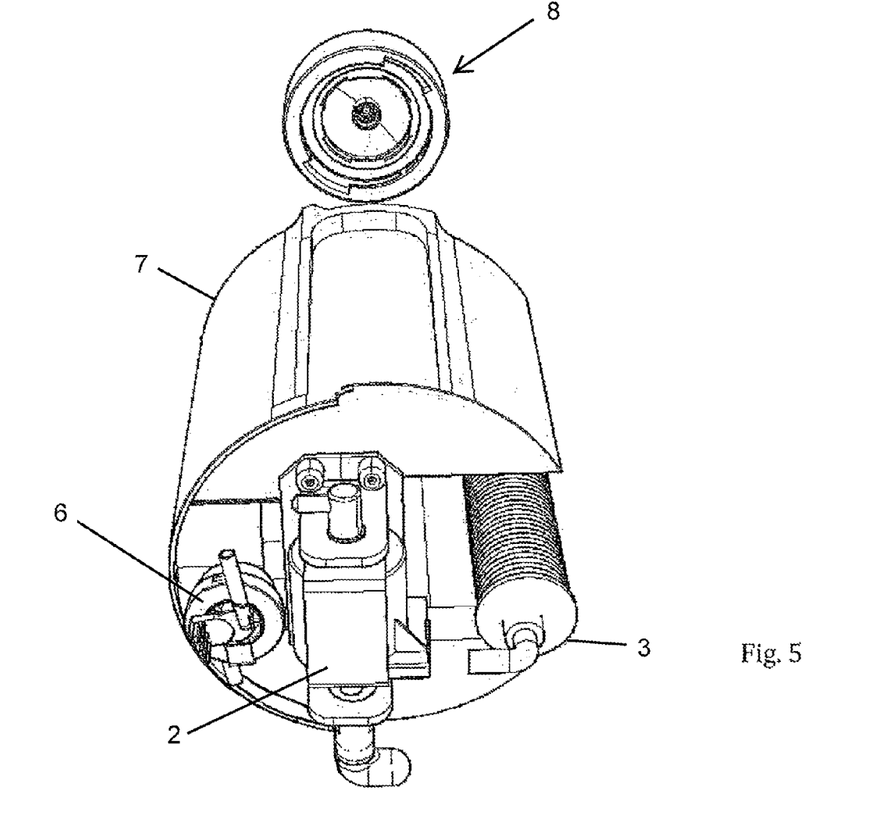

For example, as can be seen in FIGS. 1 and 2, the dispensing unit 8 has two different connection points 88 for the filter holder 85, which are associated with the two water outlets. Said outlets are both supplied by the heating means 3, but are selectively opened by means of an electrovalve 5 which is controlled by the electronic board, for example depending on a manual selection performed by the user corresponding to the coffee desired.

According to an embodiment of the present invention, the filter holder, which is also suitable as a container holder 85, cooperates with the pump 2 and with the heating means 3 in order to vary the modes m1, m2 for dispensing the coffee.

In particular, in a first coffee mode, for example for dispensing Americano coffee, the filter holder comprises a ground coffee container or filter and allows the heated water to flow without interference, in the amount d1 regulated by the electronic board.

Figure 7:
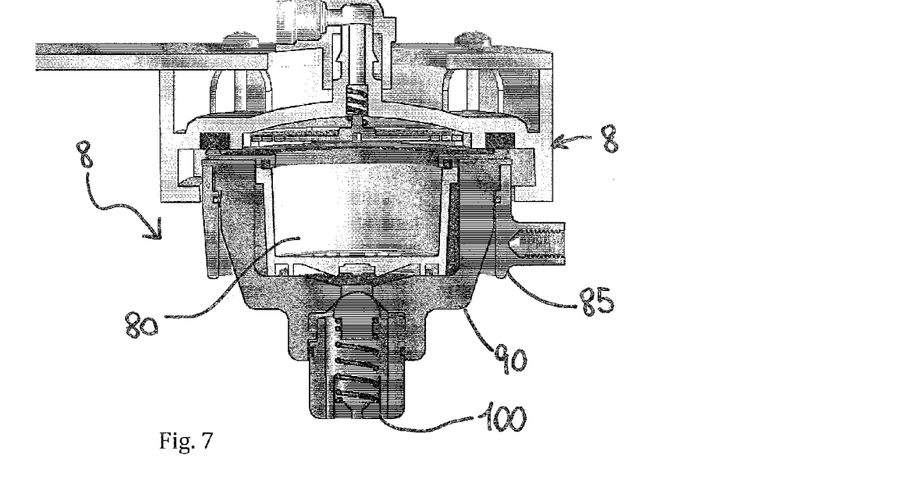
FIG. 7 is a cross-sectional view of the dispensing unit of the machine shown in FIG. 1, according to a first example of use.

For preparation of a second mode m2, instead, for example for the dispensing of espresso coffee, a mechanical valve, indicated by 100 in FIG. 7, allows an increase in the pressure of the water which has already been heated and has flowed inside the coffee container. The valve is for example calibrated to raise the pressure to 10 or 11 bar.

Without the valve in the filter holder, it is instead possible to obtain a pressure of about 1 bar in the container owing to the normal resistance offered by the coffee powder inside the container.

Figure 9:
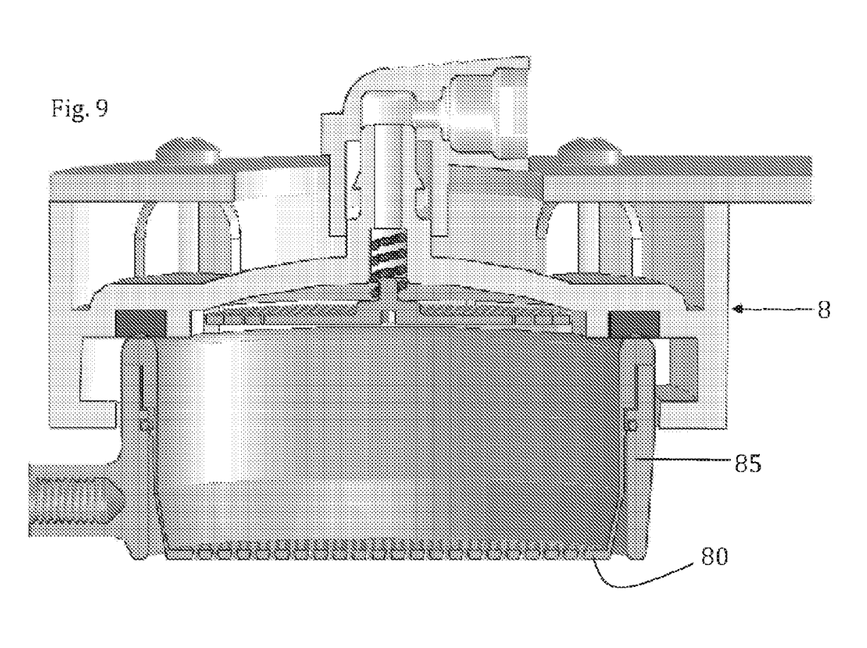
FIG. 9 is a cross-sectional view of the dispensing unit of the machine shown in FIG. 1, according to a third example of use.
Figure 10:
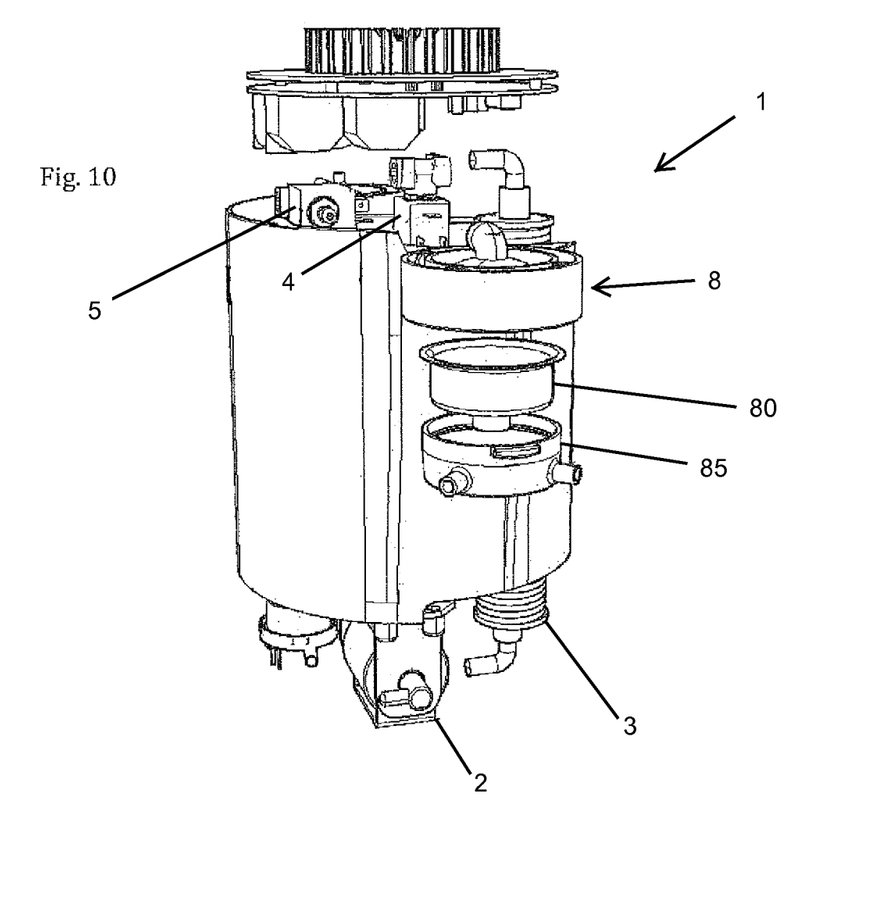
FIG. 10 is a perspective, partially exploded view of a coffee machine according to an embodiment of the present invention.

FIG. 9 shows the dispensing unit 8 comprising the coffee container 80 (filter) and a coffee container holder 85 (filter holder). This filter is designed to receive powder coffee and can be refilled manually. The container holder 85 is for example in the form of a handle which can be applied manually to the connection point 88 of the dispensing unit.

FIG. 7 shows a coffee container 80 in the form of a capsule. The capsule can be adapted to the container holder 85 according to FIG. 9 by means of an adaptor 90. In one embodiment, the valve 100 for increasing the flowrate is situated inside the adaptor 90.

It is also possible for a pod and a corresponding adaptor to be used instead of the capsule.

Figure 8:
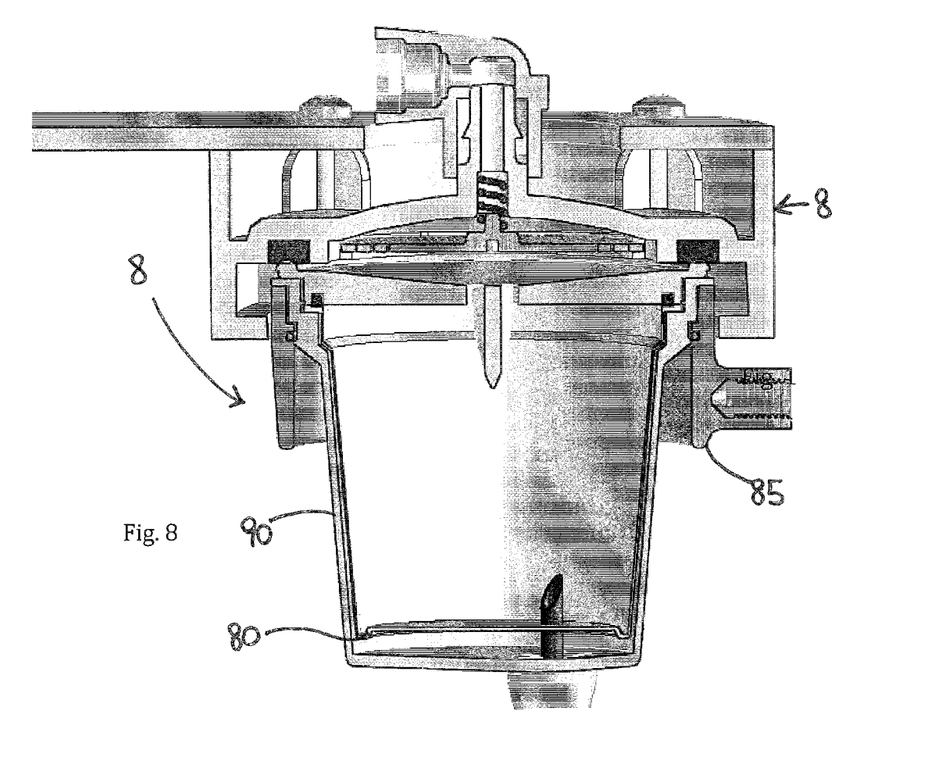
FIG. 8 is a cross-sectional view of the dispensing unit of the machine shown in FIG. 1, according to a second example of use.

FIG. 8 shows a coffee container 80 in the form of a capsule (for example K-cup manufactured by Keurig). An adaptor 90 for adapting the container holder 85 to the Keurig K-cup is provided. In this case, no valve is provided in the mixing unit.

According to an embodiment of the present invention, the user may then choose the dispensing mode by means of a user interface on the machine, for example a keypad, and insert in the container holder 85 the coffee container to be used, whether it be a ground coffee or coffee inside capsules, and if necessary the corresponding adaptor, with or without the pressure regulating valve. After applying the handle (filter holder) it is the electronic board which varies the flowrate of the water and the voltage applied to the spiral in order to obtain an ideal water temperature inside the dispensing unit.

In other words, the electronic board controls the water flowrate towards the dispensing unit and the mode for heating the water inside the heating means, while the pressure is varied mechanically, if necessary, inside the dispensing unit.

According to an embodiment of the present invention, the coffee is then prepared according to a method comprising the steps of:

pumping water towards the heating means 3;

heating the water and supplying the heated water into a dispensing unit 8, in order to extract the coffee;

and is characterized in that the water is pumped inside a tubular element 3a and is heated by a heating element 3a by means of an electromagnetic field generated by the spiral 3c and in that the pumping step and heating step are regulated electrically by means of an electronic board, so as to supply the water into the dispensing unit in different modes m1, m2, but at a same predefined temperature T. Heating of the water is performed by means of electromagnetic induction and is practically immediate.

In particular, the method envisages that in at least one of said dispensing modes both the pressure inside the dispensing unit is increased, by means of a mechanical valve designed to slow down the speed of extraction and dispensing of the coffee, for example for the preparation of espresso coffee from prepackaged capsules.

According to an embodiment of a method of the invention, the water flowrate and temperature for preparation of different coffee modes are regulated with a high degree of precision by the electronic board and the pressure is increased only if the dispensing unit is equipped with the mechanical valve.

Owing to the possibility of managing the water temperature, flowrate and pressure, the machine is able to dispense a perfect espresso coffee and a perfect Americano coffee. The coffee extraction process using the two aforementioned methods is very different:
- both in the case of espresso and in the case of filter coffee the water is rapidly heated to a temperature of between 92° C. and 94° C. at the inlet of the infusion chamber, i.e. the dispensing unit, independently of the water flowrate and the pressure;
- in the case of espresso coffee it is envisaged raising the pressure to 10 or 11 bar by means of the machine valve and conveying a reduced amount d2 of water through the heating means, for slow extraction, with the effect that all the properties of the coffee are transferred into the mixture inside the cup;
- in the case of filter coffee or Americano coffee it is envisaged that the pressure is at 1 bar (without valve or with a valve suitably calibrated in the mixing unit) and that a greater amount d2 of water is conveyed through the heating means, with the effect that the coffee is extracted quickly, while maintaining its optimum quality.

The water flow in the machine follows the path: tank, flowmeter, pump, induction exchanger, electrovalves, infusion chamber (dispensing unit), if necessary passing also through the pressure regulator (valve).

The electronic board is connected to the pump and to the flowmeter in order to regulate the quantity of water and the flowrate, to the induction exchanger in order to regulate the power and therefore the water temperature, to the outlet of the dispensing unit via which coffee is dispensed, and to the electrovalves 4 in order to discharge the pressure at the end of dispensing.

Advantageously, a single unit comprising the heating means, the pump and the electronic board is able to manage all the characteristics which distinguish the two main methods of preparing the coffee, i.e. espresso coffee and Americano coffee. The flowrate is managed by varying the voltage of the pump by means of the electronic board.

In particular, the Applicant has established that a certain flowrate of the water corresponds to a certain voltage of the pump; said flowrate may however be varied by means of the board depending on the flowrate measurements performed by means of the flowmeter. In all the operating conditions and for each dispensing mode, the electronic board receives at its input a number of data, comprising the dispensing time, the flowrate and the water temperature and performs a number of calculations for regulating the pump and the heating means.

It is envisaged that said regulating operations are performed dynamically during dispensing of the coffee.

To summarize, the advantages of one or more embodiments of the invention include:
- instantaneous dispensing, substantially without the need for pre-heating;
- simple management of the water temperature, flowrate and pressure;
- varied modes for dispensing coffee, including espresso coffee and Americano coffee;
- significant savings in power consumption, due to the fact that the machine is kept in a condition ready for use without using large amounts of energy;
- further savings in power consumption during dispensing, due to immediate heating of the water;
- optimum price/quality ratio of the machine.

In a professional environment, i.e. in bars or restaurants, the machine may be advantageously structured so as to dispense in parallel several coffees, in the same mode or in different modes, and always at the same optimum preparation temperature.

In this variant also, the coffee machine comprises water heating means and a dispensing unit for extracting the coffee with the heated water.

By way of variant with respect to the machine described above, a pumping system, comprising several pumps, is used to supply water into the heating means.

In particular, the heating means comprise several tubular elements, inside which the water supplied by the pumping system flows, and several heating elements, corresponding to the tubular elements and separated from the tubular elements by respective air cavities.

Each pump of the pumping system is associated with a respective heating element; in other words, each pump supplies water to a respective tubular element. The pump and the heating elements are connected and regulated by an electronic board, so as to supply into the dispensing unit the water heated to the predefined temperature T.

In this connection, the dispensing unit comprises several outlets through which the coffee may be dispensed, each outlet being associated with a respective heating element. Advantageously, according to this variation of embodiment, dispensing may be performed in parallel or simultaneously. In particular, parallel or simultaneous dispensing may be performed in different modes, corresponding to different types of coffee to be dispensed, or in a same mode.

Dispensing may also be selective, via one or more outlets selected from among the outlets available. Selective dispensing may also be performed in a same dispensing mode (for example espresso coffee via all the outlets selected) or in different modes, corresponding to different types of coffee to be dispensed (for example, espresso coffee via the first outlet selected and Americano coffee via the second outlet selected, for parallel or simultaneous dispensing with respect to the first outlet; and no coffee via a third outlet not selected).

According to one embodiment, one or more heating elements may be intended for steam production, for example for the preparation of cappuccino.

In this case, one or more heating elements are intended to dispense the coffee at the preset temperature and one or more heating elements are intended to generate steam which is supplied to a pipe able to be inserted inside a cup in order to froth the milk. All the heating elements and the respective pumps are under the control of the electronic board which controls operation of the elements intended to generate the steam and the respective pumps separately from the element intended to perform dispensing of the coffee.

The invention claimed is:
1. A coffee machine, comprising:
a water heater;
a pump configured to supply water into the water heater; and
a dispensing unit configured to extract coffee with the heated water;
wherein the water heater includes:
a tubular element inside which the water supplied by the pump can flow; and
a heating element separated from the tubular element by an air cavity;
wherein:
the pump and the heating element being connected and regulated by an electronic board so as to supply into the dispensing unit the heated water in at least two different modes and at a same preset temperature, the different modes corresponding to different types of coffee to be dispensed;
the tubular element is made of steel, and has a length of between 15 cm and 25 cm and diameter of between 0.5 cm and 2 cm; and
the tubular element is disposed inside an outer tube of diamagnetic insulating material, with a diameter of between 3 cm and 5 cm, the heating element is wound in a spiral about the outer tube.

2. The coffee machine according to claim 1, wherein the electronic board is configured to regulate a flowrate of water from the pump, the flowrate being higher for dispensing coffee in a first dispensing mode and lower for dispensing coffee in a second dispensing mode.

3. The coffee machine according to claim 2, wherein the electronic board is programmed to supply into the dispensing unit at least two different amounts of heated water including a greater amount and a smaller amount corresponding, respectively, to the first and second dispensing modes.

4. The coffee machine according to claim 2, wherein the dispensing unit includes at least two outlets for heated water, which can be selectively associated with the first and second dispensing modes.

5. The coffee machine according to claim 1, wherein the dispensing unit includes a coffee container and a coffee container holder.

6. The coffee machine according to claim 5, wherein the coffee container is a powder coffee filter container.

7. The coffee machine according to claim 5, wherein the coffee container is a pod or a capsule for espresso or a capsule for Americano coffee (K-cup), and wherein the dispensing unit includes an adaptor configured to adapt the container holder to the pod or capsule.

8. The coffee machine according to claim 5, wherein the dispensing unit includes a mechanical valve configured to increase a pressure of the heated water inside the coffee container.

9. The coffee machine according to claim 8, wherein the mechanical valve is inside an adaptor.

10. The coffee machine according to claim 4, wherein an adaptor with mechanical valve is applied to at least one of the outlets.

11. The coffee machine according to claim 1, wherein the preset temperature is between 92° C. and 94° C.

12. The coffee machine according to claim 1, wherein the different dispensing modes correspond to different types of coffee to be dispensed including, respectively, espresso coffee and Americano coffee.

13. The coffee machine according to claims 4, further comprising an electrovalve connected to the electronic board, the electrovalve configured to intercept the fluid towards one of the outlets.

14. The coffee machine according to claim 1, wherein the dispensing unit includes a temperature sensor connected to the electronic board, the temperature sensor is configured measure a temperature of the water downstream of the tubular element.

15. The coffee machine according to claim 1, further comprising a flowmeter situated along the fluid path between the pump and the water heater and connected to the electronic board, the flowmeter is configured to measure a water flowrate towards the water heater.

16. A coffee machine, comprising:
a water heater;
a pumping system configured to supply water into the water heater; and
a dispensing unit configured to extract coffee with the heated water;
wherein the water heater includes:
a plurality of tubular elements inside which the water supplied by the pumping system can flow; and
a plurality of heating elements corresponding to the plurality of tubular elements and separated from the plurality of tubular elements by respective air cavities;
wherein the pumping system includes a plurality of pumps, each of the plurality of pumps being associated with a respective one of the plurality of heating elements, and the plurality of pumps and the plurality of heating elements are connected and regulated by an electronic board so as to supply the heated water into the dispensing unit;
wherein the dispensing unit including a plurality of outlets, each of the plurality of outlets being associated with a respective heating element through which the coffee may be dispensed:
substantially simultaneously and at a same preset temperature, in different modes corresponding to different types of coffee to be dispensed, or in a same mode; or
selectively at the preset temperature, in one or more selected outlets, in one mode or in different modes, corresponding to different types of coffee to be dispensed.

17. The coffee machine according to claim 16, wherein the electronic board is programmed to supply into the dispensing unit at least two different amounts of heated water including a greater amount and a smaller amount corresponding, respectively, to the first and second dispensing modes.

18. The coffee machine according to claim 16, wherein the dispensing unit includes at least two outlets for heated water, which can be selectively associated with the first and second dispensing modes.

19. The coffee machine according to claim 16, wherein the dispensing unit includes a coffee container and a coffee container holder.

20. The coffee machine according to claim 19, wherein the dispensing unit includes a mechanical valve configured to increase a pressure of the heated water inside the coffee container.

21. A coffee machine, comprising:
a water heater;
a pump configured to supply water into the water heater; and
a dispensing unit configured to extract coffee with the heated water;
wherein the water heater includes:
   a tubular element inside which the water supplied by the pump can flow; and
   a heating element separated from the tubular element by an air cavity;
wherein:
   the pump and the heating element being connected and regulated by an electronic board so as to supply into the dispensing unit the heated water in at least two different modes and at a same preset temperature, the different modes corresponding to different types of coffee to be dispensed;
   the tubular element is disposed inside an outer tube of diamagnetic insulating material, the heating element is wound in a spiral about the outer tube.

22. The coffee machine according to claim 21, wherein the electronic board is configured to regulate a flowrate of water from the pump, the flowrate being higher for dispensing coffee in a first dispensing mode and lower for dispensing coffee in a second dispensing mode.

* * * * *